US005227219A

United States Patent [19]

Bayer et al.

[11] Patent Number: 5,227,219

[45] Date of Patent: Jul. 13, 1993

[54] SURFACE WAVE COMPONENTS WITH AN ACOUSTICALLY MATCHED DAMPING COMPOUND

[75] Inventors: Heiner Bayer, Olching; Michael Rogalli, Munich; Frank Dittrich, Kirchseeon; Hans Stelzl, Vaterstetten, all of Fed. Rep. of Germany

[73] Assignee: Siemens Aktiengesellschaft, Munich, Fed. Rep. of Germany

[21] Appl. No.: 402,355

[22] Filed: Sep. 5, 1989

[30] Foreign Application Priority Data

Sep. 19, 1988 [DE] Fed. Rep. of Germany ....... 3831814

[51] Int. Cl.[5] .......................... B32B 1/04; B32B 3/08; B32B 27/38

[52] U.S. Cl. .................................... 428/156; 428/195; 428/413; 428/901

[58] Field of Search ........................ 525/113; 523/463; 528/113; 428/156, 195, 413, 901

[56] References Cited

U.S. PATENT DOCUMENTS

| | | | |
|---|---|---|---|
| 2,637,716 | 5/1953 | Ott | 528/113 |
| 3,401,146 | 9/1968 | Kamal et al. | 528/113 |
| 3,409,591 | 11/1968 | Landua et al. | 528/113 |
| 3,833,404 | 9/1974 | Sperling et al. | 428/413 |
| 3,969,327 | 7/1976 | Stein et al. | 524/423 |
| 4,251,414 | 2/1981 | Xlakada et al. | 525/113 |
| 4,269,742 | 5/1981 | Goeko et al. | 528/99 |
| 4,287,014 | 9/1981 | Gaku et al. | 428/901 |
| 4,346,207 | 8/1982 | Maurer et al. | 528/367 |
| 4,379,909 | 4/1983 | Falkenburg et al. | 528/113 |
| 4,505,981 | 3/1985 | Geist et al. | 525/113 |
| 4,543,406 | 9/1985 | Otsuki et al. | 525/112 |
| 4,772,680 | 9/1988 | Noomen et al. | 525/113 |
| 4,783,915 | 11/1988 | Sakagami et al. | 428/421 |
| 4,789,241 | 12/1988 | Michal | 356/350 |

*Primary Examiner*—John C. Bleutge
*Assistant Examiner*—D. R. Wilson
*Agent, Attorney, or Firm*—Hill, Steadman & Simpson

[57] ABSTRACT

An acoustically matched reaction resin compound for damping coating of surface wave components is disclosed that contains one or more epoxy resins, one or more dicarboxylic acids or polycarboxylic acids or, respectively, acidic esters of dicarboxylic acids or polycarboxylic acids, an aliphatic or hetero-aromatic amine in a proportion sufficient to catalyze the cross linking of the reaction resin compound, and a solvent. The number of amine hydrogen equivalents and acid equivalents together is less than the number of epoxy equivalents and the uniformly mixed reaction resin compound can be set to a predetermined viscosity and thixotropy required for the application. For example, the reaction resin compound can be applied onto the wafer containing the surface wave components in a silk screening process. Sharp contours can be produced that survive the curing process in an unmodified state. The damping properties of cured reaction resin structures are excellent; corrosion induced by the resin is noticeably reduced.

6 Claims, 1 Drawing Sheet

SURFACE WAVE COMPONENTS WITH AN ACOUSTICALLY MATCHED DAMPING COMPOUND

BACKGROUND OF THE INVENTION

The present invention relates to an acoustically matched reaction resin compound for damping coating of surface wave components and to the use thereof.

Surface wave components, for example surface wave filters, are electronic components that are used to process signals of electromagnetic waves having an informational content. Depending on the components that are utilized, for example, in radar systems, television and video equipment, the signal or, respectively, the electrical pulse or current carrying the information, is converted into mechanical or, respectively, acoustic vibrations. These are referred to as surface waves.

Piezoelectric transducers are used for electro-acoustic conversion or for the generation of the surface waves. These piezoelectric transducers are constructed from defined ceramics or crystalline materials, for example lithium niobate. The acoustic properties of the piezoelectric transducer are influenced by the structure of the piezoelectric transducer. In this regard, the acoustic properties are influenced by the specific geometrical design of the "sound-generating" transducer surface. It is thereby possible to designationally modify the acoustic signal. This, for example, could allow the filtering of specific wavelength ranges out of the overall spectrum, for example the intermediate frequency of a television or video signal of about 38 MHz.

In order to prevent an undesirable echo due to the reflection of surface waves that cannot be completely converted back into electrical signals, or due to surface waves that propagate in the wrong direction, the surface of the transducer element is provided with a damping compound. The damping compound functions to absorb the energy of the surface waves. Heretofore, the damping compound, applied only in defined regions of the component such as the chip edges, has been composed of an organic material, for example a polyamide, because of the required, mechanical-dynamic properties.

There are a number of methods, through which the damping layer can be applied. For example, formed members of an extruded material can be tailored, and then are applied on the transducer surface. The members are firmly joined to the surface, through melting, in a thermal step. This step, however, must be individually performed for each component, and is involved and time-intensive. It is also known to use printing methods such as, for example, silk screening.

SUMMARY OF THE INVENTION

The present invention provides a material for damping a surface wave filter, that affords the required acoustic properties. The material of the present invention is free of inorganic fillers and can be applied onto the necessary regions of the substrate surface through a simple process.

To this end, an acoustically matched reaction resin compound for damping coating of surface wave components is provided. The compound comprises: one or more epoxy resins; at least one compound chosen from the group consisting of dicarboxylic acids and polycarboxylic acids, or acid esters of dicarboxylic acids and polycarboxylic acids; an aliphatic or hetero-aromatic amine in an amount sufficient to catalyze the cross linking of the reaction resin compound; and a solvent. The number of amine hydrogen equivalents and acid equivalents together is less than the number of epoxy equivalents, and the mixed reaction resin compound has a sufficient viscosity to meet the required application.

In an embodiment of the present invention, the compound includes an epoxy resin of the glycidylether type.

In an embodiment of the present invention, the epoxy resin is a solid resin of the diglycidylether type based on bisphenol A or phenol novolak, or cresol novolak.

In an embodiment of the present invention, the epoxy resin contains a partially epoxidized, unsaturated polymer.

In an embodiment of the present invention, the epoxy resin contains a polybutadiene wherein approximately 4 to about 50% of the double bonds are epoxidized.

In an embodiment of the present invention, the compound includes trimethyladipic acid.

In an embodiment of the present invention, the compound includes a substituted imidazole.

In an embodiment of the present invention, the amine constituent comprises one or more NH bonds.

In an embodiment of the present invention, the solvent comprises one or more constituents that are selected from the group consisting of ether, ester, alcohols or related, multifunctional compounds, wherein the boiling point of the solvent mixture is above 100° C.

In an embodiment of the present invention, the solvent mixture comprises benzylalcohol and ethoxypropylacetate.

In an embodiment of the present invention, the compound includes the necessary components for producing a silk screenable paste therein.

In an embodiment of the present invention, the compound is applied onto a surface wave component for acoustic damping.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

Figure 1:
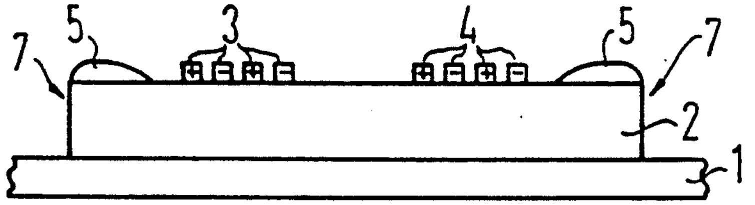
FIG. 1 illustrates a cross-sectional view of a surface wave component, specifically, a surface wave filter.

The present invention provides an acoustically matched reaction resin compound for damping coating of surface wave components comprising:

a) one or more epoxy resins;

b) one or more dicarboxylic acids or polycarboxylic acids or, respectively, acidic esters of dicarboxylic acids or polycarboxylic acids;

c) an aliphatic or heteroaromatic amine in an amount sufficient to catalyze the cross linking of the reaction resin compound; and d) a solvent.

The amine number of hydrogen equivalents and acid equivalents together is less than the number of the epoxy equivalents, and the mixed reaction resin compound has the required viscosity and thixotropy necessary for the specific application.

In an embodiment, the epoxy resin is of the glycidylether type. In an embodiment, the resin is based on bisphenol A, phenol or, respectively, cresol novolak.

The reaction resin compound of the present invention, which is cured with carboxylic acid and wherein the curing is catalyzed by amines is especially suited for use in a silk screening process. To this end, the compound can be applied in bubble-free form in thick layers. Moreover, the reaction resin compound of the present invention has an adequately long duration of viability of several days. This duration of use, or viability, is of great importance in order to provide an economically viable silk screening process.

The present invention also provides a compound that has good silk screenability without the use of fillers. Furthermore, the reaction resin compound of the present invention has extremely good acoustic damping properties. Moreover, the compound of the present invention is very insensitive to moisture and quick curing. Still further, the starting materials that are utilized to create the resin of the present invention are not harmful either in their use or the disposal of same. The starting materials have a low content of chloride ions and chemically bonded chlorine. This is of importance for use of the materials in electronic components because this reduces the risk of corrosion.

For use in a silk screening process, a compound that has good flow properties, i.e., an adequately low-viscosity mass, is desirable for the application of the reaction resin utilizing such a method. This allows one to obtain a uniform, smooth film. For example, resins having viscosities between approximately 30000 to about 90000 mPas/25° C. have been found to function satisfactorily. Such resins also provide good silk screening images.

The initial viscosity of the compound can be easily adjusted based on the solvent content of the reaction resin compound. For example, to achieve a range of between approximately 30000 to about 90000 mPas/25° C., a solvent mixture of ethoxypropylacetate/benzylalcohol is utilized. For example, the ethoxypropylacetate/benzylalcohol mixture is utilized in a proportion, by weight, of approximately 22% to about 28%.

By utilizing a lower solvent proportion, a steep rise in the viscosity of the reaction resin compound is achieved. However, a rise of the gel over time can occur in a ready-to-use mixture having suitable viscosity. On the one hand, due to the evaporation on the silk screen, solvent is lost; on the other hand, chemical reactions will begin when the components are mixed, resulting in curing and, thus, a rise in viscosity. Accordingly, it is necessary to use solvents that have a high boiling point, in order to keep the evaporation losses to a minimum. But, on the other hand, the solvent constituents of the compound must be capable of being completely eliminated after the printing step, under defined exhaust air conditions.

In order to prevent a further flow of the compound, after the bubble-free application of the compound, and in order to produce a sharp printed image true to the contour lines, the compound should have the property of becoming more viscous. This is also necessary in order to stabilize the compound until the exhaust air and curing process have occurred. Although these appear to be contrary requirements, they are met by thixotropic systems. In a thixotropic system, the viscosity of the compound decreases upon application of a shearing force to the compound; at the end of the shearing stress, the viscosity of the compound returns to its original value. The thixotropy index (quotient of two viscosities that are measured at shearing rates that differ by the factor 10) is a measurement of the thixotropic behavior of a compound. In an embodiment of the present invention, the reaction resin compound of the present invention has a thixotropy index of approximately 1.2. Accordingly, it has been demonstrated, that a weakly thixotropic system is suitable for silk screening applications.

Although the resultant reaction resin compound has a useful life of several days (the viscosity doubles over the course of 3 to 4 days), it is preferable to prepare the resin component and the hardening component separately from one another, and the mix the components in the desired stoichiometric ratio shortly before their use.

For example, the resin component can be composed of: the resin or resins; solvents; and if desired, of additional constituents that are used for silk screening compositions. These constituents, for example, can include additives that promote the rise and bursting of bubbles in the ready-to-use resin compound in a "printed" layer of reaction resin compound, but, are free of inorganic solids.

The hardener component comprises the remaining constituents of the compound. Namely, the dicarboxylic acids or polycarboxylic acids or, respectively, the acidic esters thereof, an aliphatic or heteroaromatic amine, as well as a further solvent. These components can be located in a closed vessel under a slightly elevated temperature in a homogenized state and thereby stored as a stable solution or emulsion for several months without a significant increase in the viscosity of the components.

In addition to the viscosity, a further quantity that influences the character of the resin is the stoichiometry. The stoichiometry is determined by the epoxy value for the resin component and the acid number for the hardener component. The term "epoxy value" refers to the number of epoxy equivalents per weight unit. The term "acid number" refers to the number of acid equivalents per weight unit. The mixing ratio of the individual components is calculated from these two values in order to obtain the required stoichiometry for the proper network formation.

When an amine, that includes hydrogen atoms bonded to the nitrogen, is contained as the catalyst in the hardener component, the amine hydrogen equivalents in the hardener component must be taken into consideration. For a usable reaction resin compound, the number of amine hydrogen equivalents and acid equivalents together should be less than the number of epoxy equivalents. Utilizing this composition or stoichiometry, good shaped material properties and a good damping behavior of the cured reaction resin compounds are achieved.

Various epoxy resins can be used for the resin component in the present invention. For example, the epoxy resins that can be utilized include glycidylether of cresol novolak; epoxized polybutadienes; and solid resins of the diglycidylether type based on bisphenol A as well as mixtures of these resins. For certain electronic applications, the glycidylether resins are preferred, because they have a low chloride ion content and a low chemically bonded chlorine content, when compared with other compounds in their compound class. Other resins that can be utilized can even be manufactured in a completely chlorine-free processes, for example partially epoxized, unsaturated polymers. In an embodiment of the present invention, polybutadienes wherein approximately 4 to about 50% of the double bonds are epoxized, are utilized; the remaining double bonds can be hydrated.

The acids that can be utilized as a hardener include dicarboxylic acids and polycarboxylic acids. In an embodiment of the present invention, derivatives of saturated 1,2- through 1,4-dicarboxylic acids or, respectively, their isomer mixtures, particularly derivatives of succinic acid and adipic acid are preferred. In a preferred embodiment, trimethyladipic acid is utilized. However, it should be noted that it is also possible to utilize unsaturated or higher-molecular dicarboxylic acids or acidic esters thereof. For example, the acidic ester of dihydroxypropane and hexahydrophthalic acid or the monoethylester of the hexahydrophthalic acid can also be utilized.

The compounds that can be utilized as basic catalysts includes aliphatic and hetero-aromatic amines, particularly substituted imidazoles. In a preferred embodiment, 2-ethyl-4-methylimidazole (2,4-EMI) is utilized. The amine is selected such that it catalyzes the reaction of the carboxylic acid functions with the epoxy groups and affects a homopolymerization of the epoxy groups. In addition to exhibiting good catalytic activity, the amine should also have an adequately high boiling point. This will prevent the amine from escaping from the reaction resin compound during the drying of the compound. The hydrogen atoms bonded to nitrogen in the amine allow the amine to react with the epoxy functions when curing the reaction resin compound to create a polymer. This prevents an evaporation of the amine from the finished component that is provided with cured reaction resin. The amine should only be present in a sufficient quantity to act as a catalyst and in comparison to the carboxylic acid is utilized in a smaller stoichiometric amount.

The solvent preferably has a high boiling point of at least approximately 100° C. The solvent can comprise one or more constituents selected from the group consisting of ethers, esters, alcohols or, related, multi-functional compounds. Mixtures containing benzlalcohol, particularly in combination with ethoxypropylacetate have been found to provide advantageous results.

By way of example, and not limitation, examples of the present invention will now be set forth.

FIRST EXAMPLE

This example sets forth the production of the constituents and of the reaction resin compound.

An embodiment of the production of the resin and the hardener component, and of the preparation of a ready-to-use reaction resin compound, on a laboratory scale, will now be set forth below:

Resin constituent: 250 grams of Quatrex 1410® are placed in a 500 ml glass bottle with a magnetic stirrer. After the addition of 1 gram of Modaflow®, 53 grams of benzlalcohol, and 44 grams of ethoxypropylacetate, the vessel is closed and is stirred for two hours at 110° C. A pale yellow, slightly cloudy, highly viscous liquid having a viscosity of about 24000 mPa.s/25° C. is obtained that can be stored without modification thereto for several months.

Hardener constituent: 164 grams of trimethyladipic acid, 45 grams of 2-ethyl-4-methylimidazol and 40 grams of ethoxypropylacetate are stirred for 1.5 hours at 90° C. A yellow to reddish brown, highly viscous liquid, having a viscosity of about 1900 mPa.s/25° C. is obtained that can be stored without modification for several months.

Reaction resin: for producing the reaction resin compound, 100 weight parts of the resin component (set forth above) and 16 weight parts of the hardener component (set forth above) are combined. The resultant reaction resin compound was a beige, opaquely shimmering, highly viscous liquid (about 3800 mPa.s/25° C.). The higher viscosity of the resultant compound, in comparison to the individual constituents is attributable to the fact that the finished reaction resin compound is an emulsion.

Figure 2:
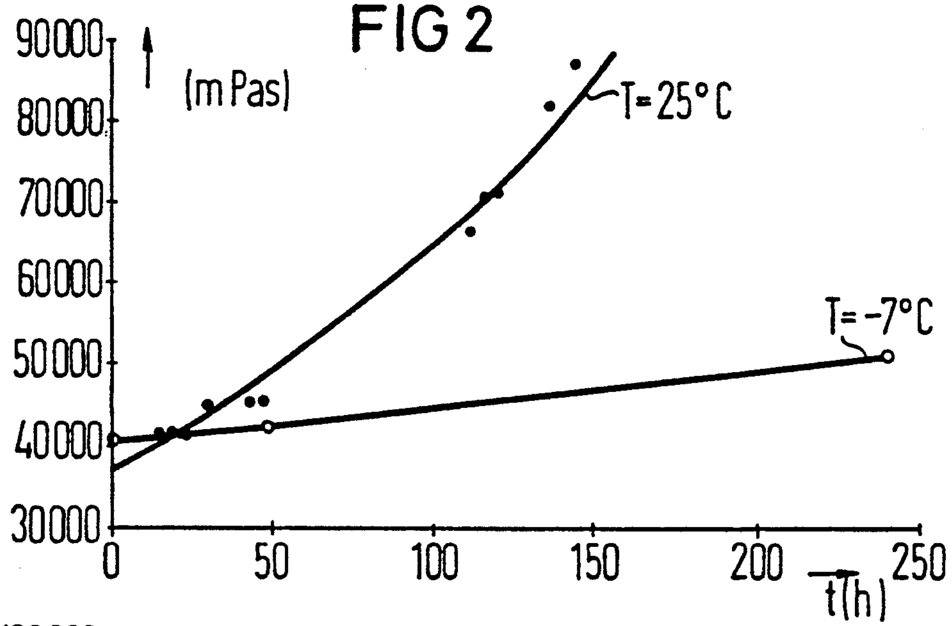
FIG. 2 illustrates, graphically, the viscosity behavior of a reaction resin compound of the present invention versus time.

FIG. 2 illustrates, graphically, the increase in viscosity of the finished reaction resin compound, stored in a closed vessel, at different temperatures. As illustrated, the viscosity doubles during the course of 3 to 4 days at room temperature. The compound has a useful life, for use in a silk screening process, of several days. The emulsion is stable during this time frame; no separation of the individual constituents is observed.

The flat portion of the curve of FIG. 2 illustrates the viscosity behavior at −7° C. When the reaction resin compound is stored at this lower temperature, the chemical reaction through which the resin hardens is retarded and a longer useful life of the mixture is achieved.

Figure 3:
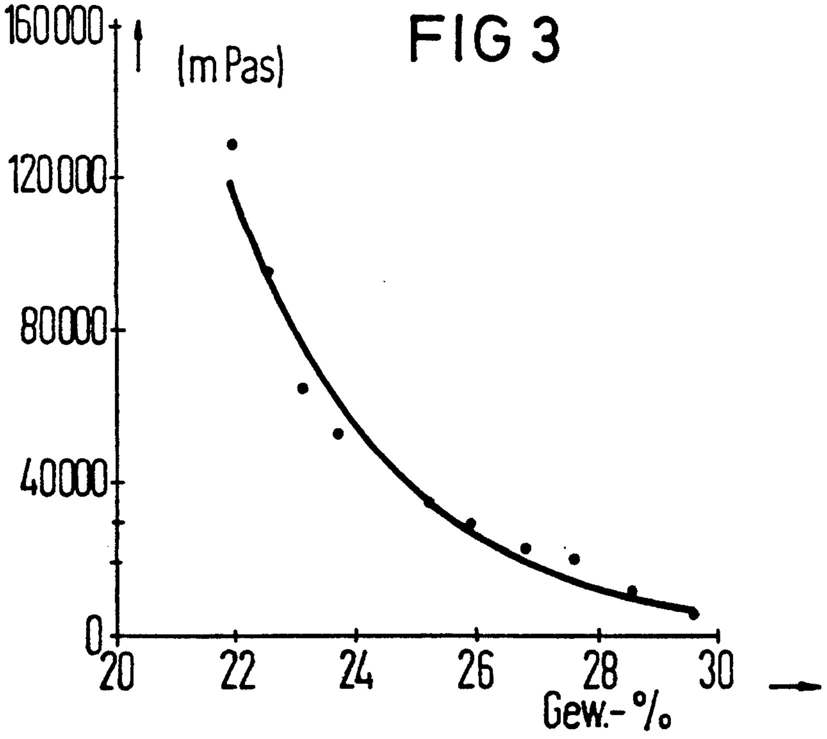
FIG. 3 illustrates, graphically, the viscosity behavior of a reaction resin compound of the present invention versus the solvent content of the compound.

FIG. 3 illustrates, graphically, the viscosity of the reaction resin compound versus the solvent content. As illustrated, the viscosity of the reaction resin compound can be set to an arbitrary value by varying the solvent that is added thereto.

For use in a silk screening process, an initial viscosity between approximately 30000 to about 90000 mPa.s/25° C. is desired. A solvent content of approximately 22 to about 28 weight percent is necessary to achieve this viscosity.

SECOND EXAMPLE

This example sets forth the application and curing of the reaction resin compound.

In this example, the reaction resin compound is applied during a silk screening process. When printing, for example, on a surface wave filter in a layer thickness of about 30 μm, the compound exhibits good flow behavior, and can be applied bubble-free, so that sharp-edged printing is achieved. The good resolution obtained in this manner enables the production of superfine structures, whose flat gradient of slope is a prerequisite for good acoustic properties of the surface wave filter. These properties, moreover, can be reproduced over several wafers or over several batches of the reaction resin compound. This is an absolute prerequisite for the mass production of filters.

After the application of the reaction resin compound onto the surface wave component, all of the solvent must be removed from the mass before it is hardened. The evaporation of the solvent can be accelerated, for example, by elevating the temperature, intensification of the outer ambient air, or by applying a vacuum. Utilizing a purely thermal evaporation, for example, a loss of mass that approximately corresponds to the theoretical value of the solvent content can be achieved after a one hour aeration at 70° C.

For curing the reaction resin compounds, however, a temperature of above 130° C. should not be used since there is a danger of wafer breakage at higher temperatures. Utilizing a one-hour curing process at 130° C., a good curing of the reaction resin compound of the present invention can be achieved. However, it should be noted that the mass can also be completely cured at lower temperatures. It should also be noted that for other hardening conditions, it is possible to identify the curing of the compound utilizing a thermo-analytic investigation via the reaction heat that is released during the chemical curing reaction.

During the curing process, no wrinkling or shrinking of the reaction resin structures produced in the silk screening process occurs. Accordingly, the print image of the process is thus maintained unmodified.

FIG. 1 illustrate, schematically, a longitudinal cross-section through a surface wave component. Specifically, a surface filter is illustrated, onto which structures 5 of the reaction resin of the present invention were applied through a silk screening process. A substrate 2 composed of a piezoelectric material, for example lithium niobate, having a thickness, in the embodiment illustrated, of approximately 500 μm, has its underside glued, surface-wide, to a copper tank 1. Transducer electrodes 3 and 4 are located on the surface of the substrate 2.

In FIG. 1, a section is taken through the "fingers" of the electrode arrangements 3, 4, arranged in a comb-like fashion. The two electrode combs have a different polarity (identified with a "+" or "−"), and have their "fingers" thrust into one another and thus, together, form a transducer element. For example, a surface wave transmitter 3 is provided that converts the electrical signal into mechanical or, respectively, oscillatory signals, the so-called surface waves, whereas and an electrode arrangement 4 is provided for the surface wave receiver. The surface wave receiver converts the filtered surface waves back into electrical signals.

The structures 5 of cured reaction resin are applied on the surface along the substrate edges 7 outside the active transducer region. These structures 5 provide a damping of the surface waves and prevent a reflection of the waves at the substrate edge 7. As can be seen in FIG. 1, the resin is typically located at the two edges that lie opposite to each other on the surface of the substrate in a "running direction" of the surface waves. It should be noted, however, that all of the edges on the surface of the substrate can also be coated with the resin. Such a structure would provide an all around damping. The flat gradient of slope of the resin structures can also be easily seen. This provides an additional suppression of the reflection of the surface waves since they facilitate the "transition" of the wave from the substrate 2 into the damping compound 5.

The cured resins that have been set forth above, by way of example, have suitable glass transition temperatures. As a result thereof, the acoustic properties of the cured resin structures remain stable and well-adapted, without modification, even at elevated temperatures.

Quantitatively, the damping effect can be calculated from the frequency spectrum of the re-converted electrical signal obtained by a Fourier transformation. The amplitude height of the echoes received by reflection are measured relative to the main pulse within a defined chronological distance from the main pulse. The observed attenuation that is achieved with the reaction resin compounds of the present invention amounts to 45–55 dB.

Further advantages that occur by utilizing the resin of the present invention include the fact that the resin provides a longer operation of the surface wave component. Moreover, the moisture absorption of the cured resin structure is low. Still further, because no corrosion-active ions, or only very few corrosion-active ions, are contained in the resins of the present invention, the resin is also suitable for use in contact with metallic electrode structures or other metallic parts, since corrosion is not promoted.

Furthermore, the thermal loadability of the resin is excellent: The cured resin structures can survive in an unmodified and undamaged condition brief-duration temperature elevations up to 260° C., as well as several hours, up to 130° C. as can appear in the manufacturing process. Thermo-gravimetric analysis has demonstrated that the beginning of the decomposition of the resin occurs only after 300° C. Since the cured resin of the present invention does not contain any volatile constituents, whatsoever, gas is not produced during operation of the component or, respectively, at elevated temperatures, so it is possible to integrate components coated with the resin in gas-tight housings.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

We claim:

1. A surface wave component composed of a substrate of piezoelectric material and transducer electrodes on a surface of the substrate, and having printed-on structures on the surface of the substrate, wherein the printed-on structures having a shallow gradient of slope are composed of a resin composition that is acoustically matched to the materials of the substrate such that damping achieved during operation of the surface wave component amounts to 45 through 55 dB, and wherein the resin composition comprises:

a) at least one epoxy resin, b) at least one hardener chosen from the group consisting of dicarboxylic acid, polycarboxylic acid, acid esters of dicarboxylic acids, and acid esters of polycarboxylic acids, c) a catalyst chosen from the group consisting of an aliphatic and hetero-aromatic amine, in a proportion sufficient to catalyze the cross-linking of the resin composition, and d) a solvent, wherein the hardener and the epoxy resin are present in a sufficient amount to form a network and the acid equivalents of the hardener and the amine hydrogen equivalents of the catalyst together are present in a lesser amount than the epoxy equivalents and the resin composition has a viscosity that can be adapted for a printing process for applying the printed-on structures onto the surface of the substrate by varying the solvent content of the resin composition.

2. The surface wave component of claim 1 wherein the epoxy resin is a solid resin of a diglycidylether bearing hydroxy groups and is chosen from the group consisting of bisphenol A, phenol novolak, and cresol novolak.

3. The surface wave component of claim 1 wherein the epoxy resin constituent comprises a polybutadiene wherein approximately 4 to about 50% of the double bonds are epoxidized.

4. The surface wave component of claim 1 wherein the amine is a substituted imidazole.

5. The surface wave component of claim 1 wherein the amine constituent comprises at least one NH bond.

6. The surface wave component of claim 1 wherein the solvent comprises one or more constituents that are selected from the group consisting of ether, ester, and alcohols, wherein the boiling point of the solvent mixture is at least approximately 100° C.

* * * * *